United States Patent
Kurabayashi

(10) Patent No.: US 11,209,941 B2
(45) Date of Patent: Dec. 28, 2021

(54) BOARD GAME SYSTEM, NON-TRANSITORY COMPUTER READABLE MEDIUM, GAME PIECE, AND GAME PIECE SET

(71) Applicant: CYGAMES, INC., Tokyo (JP)

(72) Inventor: Shuichi Kurabayashi, Tokyo (JP)

(73) Assignee: CYGAMES, INC., Tokyo (JP)

(*) Notice: Subject to any disclaimer, the term of this patent is extended or adjusted under 35 U.S.C. 154(b) by 293 days.

(21) Appl. No.: 16/376,536

(22) Filed: Apr. 5, 2019

(65) Prior Publication Data

US 2019/0232154 A1   Aug. 1, 2019

Related U.S. Application Data

(63) Continuation of application No. PCT/JP2017/036329, filed on Oct. 5, 2017.

(30) Foreign Application Priority Data

Oct. 7, 2016  (JP) .............................. JP2016-199428

(51) Int. Cl.
*G06F 3/044* (2006.01)
*G06F 3/0488* (2013.01)
(Continued)

(52) U.S. Cl.
CPC ................ *G06F 3/044* (2013.01); *A63F 3/00* (2013.01); *A63F 3/00643* (2013.01);
(Continued)

(58) Field of Classification Search
CPC ........ G06F 3/044; G06F 3/041; G06F 3/0488; A63F 13/2145; A63F 13/426;
(Continued)

(56) References Cited

U.S. PATENT DOCUMENTS

2007/0062852 A1* 3/2007 Zachut ................ A63F 3/00643
  209/683
2008/0161086 A1  7/2008 Decre et al.
2012/0007808 A1  1/2012 Heatherly et al.

FOREIGN PATENT DOCUMENTS

JP   2008-528226 A   7/2008
JP   2016-4341 A   1/2016
WO   2013/039388 A1   3/2013

OTHER PUBLICATIONS

"Meet Playtable, the world's first board game console" Feb. 21, 2019; https://web.archive.org/web/20160921061352/http://playtable.xyz/.

(Continued)

*Primary Examiner* — Werner G Garner
(74) *Attorney, Agent, or Firm* — Osha Bergman Watanabe & Burton LLP

(57) ABSTRACT

The present invention provides a board game system in which an electrostatic-capacitance-based touchscreen that is capable of detecting a plurality of touched positions by detecting changes in electrostatic capacitance is used as a board. The board game system includes an electronic device equipped with the touchscreen; and game pieces that are used while being placed on the touchscreen and that are constituted at least partially of a conductive section. The conductive section is laid out so as to be intervened by a non-conductive section or gaps on the contact face. In the case where the game piece is placed on the touchscreen, the conductive section causes the predetermined or greater amount of change in the electrostatic capacitance at the contact positions of the conductive section on the contact face in the case where the conductive section is touched by the user. The electronic device recognizes the game piece.

10 Claims, 11 Drawing Sheets

(51) Int. Cl.
    *A63F 13/426*      (2014.01)
    *A63F 3/00*        (2006.01)
    *A63F 13/79*       (2014.01)
    *A63F 13/2145*     (2014.01)
    *A63F 13/80*       (2014.01)
    *G06F 3/041*       (2006.01)
    *A63F 3/02*        (2006.01)

(52) U.S. Cl.
    CPC ...... *A63F 3/00697* (2013.01); *A63F 13/2145* (2014.09); *A63F 13/426* (2014.09); *A63F 13/79* (2014.09); *A63F 13/80* (2014.09); *G06F 3/041* (2013.01); *G06F 3/0488* (2013.01); *A63F 3/02* (2013.01); *A63F 2003/00662* (2013.01); *A63F 2003/00725* (2013.01); *A63F 2003/00845* (2013.01)

(58) Field of Classification Search
    CPC .. A63F 13/79; A63F 13/80; A63F 3/00; A63F 3/00643; A63F 3/00697; A63F 3/02; A63F 2003/00662; A63F 2003/00725; A63F 2003/00845
    See application file for complete search history.

(56) References Cited

OTHER PUBLICATIONS

International Search Report issued in Application No. PCT/JP2017/036329, dated Jan. 9, 2018 (2 pages).

\* cited by examiner

| AREA COORDINATES | ON-THE-MOVE FLAG | GAME-PIECE IDENTIFIER |
|---|---|---|
| 0,0 | 0 | F0001 |
| 1,0 | 0 | F9999 |
| 2,0 | 0 | F0002 |
| ... | ... | ... |
| 3,2 | 1 | F0023 |
| ... | ... | ... |

BOARD GAME SYSTEM, NON-TRANSITORY COMPUTER READABLE MEDIUM, GAME PIECE, AND GAME PIECE SET

TECHNICAL FIELD

The present invention relates to a board game system, particularly to a board game system in which an electrostatic-capacitance-based touchscreen is used as a board.

BACKGROUND ART

Recently, smart devices equipped with touchscreens, such as smartphones and tablet computers, are generally in widespread use, and the sizes of the touchscreens are increasing. There are various types of touch detection technology for touchscreens, among which electrostatic-capacitance-based touchscreens that are capable of detecting multi-touch are adopted in many smart devices. Note, however, that the number of touched positions that can be detected as a multi-touch is generally about ten points.

In this situation, attempts are being made to use a smart device as a board for a board game. If it becomes possible to use the touchscreen of a large-size smart device as a board for a board game, such as chess or Dragon Quest (registered trademark), it will be possible to drastically improve effects in the board game, including effects while moving pieces, automatic application of rules, such as automatic calculation of HPs or MPs, and effects like attack or recovery.

As an example of a method of associating a smart device with a board game, there is a method in which pieces are identified by using RFID tags (Non-Patent Literature 1).

CITATION LIST

Patent Literature

NPL 1 playtable, http://playtable.xyz/

SUMMARY OF INVENTION

Technical Problem

With the method in which pieces are identified by using RFID tags, although the maximum number of points that can be detected as a multi-touch is not exceeded, it is necessary to install a large number of RF readers on the back of a touchscreen and to attach RFID passive tags to pieces. The position of a piece on the touchscreen is recognized by one of the installed RF readers detecting the RFID passive tag attached to that piece. As described above, with this method, since RFID tags are used, it is possible to simultaneously identify the kind of a piece and to recognize the position of the piece. However, since it is necessary to install a large number of RF readers on the back of a touchscreen, it is not possible to apply the method directly to an existing terminal equipped with a touchscreen, such as a large-size tablet. Furthermore, since it is known that signal congestion occurs when RFID passive tags are disposed densely, there is a concern that the operation thereof might be unstable in the case where pieces are disposed with high density.

The present invention has been made in order to solve the problem described above, and it is a main object thereof to provide a board game system, etc. that make it possible to use an existing electrostatic-capacitance-based touchscreen as a board for a board game.

Solution to Problem

The problem described above is solved by the present invention having the following features. Specifically, a board game system according to an aspect of the present invention is a board game system in which an electrostatic-capacitance-based touchscreen that is capable of detecting a plurality of touched positions by detecting changes in electrostatic capacitance is used as a board, the board game system being characterized in that: the board game system includes an electronic device equipped with the touchscreen; and one or more game pieces that are used while being placed on the touchscreen and that are constituted at least partially of a conductive section, a contact face of each of the game pieces, which comes into contact with a placing face of the touchscreen, is configured to include the conductive section, the conductive section is laid out so as to be intervened by a non-conductive section or gaps on the contact face, and in the case where the game piece is placed on the touchscreen, the conductive section does not cause a predetermined or greater amount of change in the electrostatic capacitance at contact positions of the conductive section on the contact face in the case where the conductive section is not touched by a user, and the conductive section causes the predetermined or greater amount of change in the electrostatic capacitance at the contact positions of the conductive section on the contact face in the case where the conductive section is touched by the user, and the electronic device includes a display part configured to display a game field constituted of a plurality of areas on the touchscreen; a touched-position detecting part configured to individually detect, as a plurality of touched positions, positions at which the predetermined or greater amount of change in the electrostatic capacitance has occurred as a result of the contact of the conductive section on the contact face; a recognition part configured to recognize the game piece on the basis of relative positional relationships among the plurality of touched positions; a position determining part configured to determine the position of one of the areas for the game piece recognized on the basis of the plurality of touched positions; and a move-state determining part configured to determine a move state of the recognized game piece on the basis of a history of the position of the determined area of the recognized game piece.

Furthermore, as an aspect of the present invention, preferably, the game piece has a plurality of projections formed of the conductive section, and end faces or end points of the plurality of projections constitute at least portions of the contact face.

Furthermore, as an aspect of the present invention, preferably, the move-state determining part determines the move state of the recognized game piece on the basis of whether or not the position of the area currently determined or the position of the area determined immediately before for the recognized game piece are the same.

Furthermore, as an aspect of the present invention, preferably, the move state includes a state in which the game piece has been newly put at the position of one of the areas on the touchscreen, a state in which the game piece has been picked up from the touchscreen, and a state in which the game piece has been moved to and put at the position of another one of the areas on the touchscreen.

Furthermore, as an aspect of the present invention, preferably, the conductive section is laid out on the contact face so as to be intervened by a non-conductive section or gaps such that the layout position thereof differs in accordance with the kind of the game piece, and the recognition part recognizes the kind of the game piece on the basis of relative positional relationships among the plurality of touched positions.

Furthermore, as an aspect of the present invention, preferably, the conductive section is laid out on the contact face so as to be intervened by a non-conductive section or gaps such that the positions of three vertices among the four vertices of a minimum bounding rectangle identified by using the plurality of touched positions are located at touched positions among the plurality of touched positions, and the recognition part identifies relative positional relationships among the plurality of touched positions by using the touched positions corresponding to the positions of the three vertices as reference points.

Furthermore, as an aspect of the present invention, preferably, the game pieces include an extended game piece having an extension piece including the conductive section attached thereto, the conductive section is laid out on the contact face of the extended game piece so as to be intervened by a non-conductive section or gaps such that the positions of three vertices among the four vertices of a minimum bounding rectangle identified by using the plurality of positions touched by the extended game piece are located at touched positions among the plurality of touched positions, and the recognition part identifies relative positional relationships among the plurality of touched positions by using the touched positions corresponding to the positions of the three vertices as reference points and recognizes the extended game piece on the basis of the relative positional relationships.

A non-transitory computer readable medium storing a program according to an aspect of the present invention is a non-transitory computer readable medium storing a program that is executed by an electronic device equipped with an electrostatic-capacitance-based touchscreen that is capable of detecting a plurality of touches, the program being characterized in that: the program is executed in order to use the touchscreen as a board for a board game, in the case where a game piece that is used while being placed on the touchscreen and that is constituted at least partially of a conductive section is placed on the touchscreen, no touched position of the game piece is detected by the touchscreen in the case where the game piece is not touched by a user, and a plurality of positions touched by the game piece are detected by the touchscreen in the case where the game piece is touched by the user, and the program causes the electronic device to execute a step of displaying a game field constituted of a plurality of areas on the touchscreen; a step of individually detecting a plurality of positions touched by the game piece; a step of recognizing the game piece on the basis of relative positional relationships among the plurality of touched positions; a step of determining the position of one of the areas for the recognized game piece on the basis of the plurality of touched positions; and a step of determining a move state of the recognized game piece on the basis of a history of the position of the determined area of the recognized game piece.

A game piece according to an aspect of the present invention is a game piece for a board game system in which an electrostatic-capacitance-based touchscreen that is capable of detecting a plurality of touched positions by detecting changes in electrostatic capacitance is used as a board, the game piece being used while being placed on the touchscreen, the game piece being characterized in that: the game piece is constituted at least partially of a conductive section, and a contact face of the game piece, which comes into contact with a placing face of the touchscreen, is configured to include the conductive section, and the conductive section is laid out so as to be intervened by a non-conductive section or gaps on the contact face, and in the case where the game piece is placed on the touchscreen, the conductive section does not cause a predetermined or greater amount of change in the electrostatic capacitance at contact positions of the conductive section on the contact face in the case where the conductive section is not touched by a user, and the conductive section causes the predetermined or greater amount of change in the electrostatic capacitance at the contact positions of the conductive section on the contact face in the case where the conductive section is touched by the user.

Furthermore, as an aspect of the present invention, preferably, the conductive section is laid out on the contact face so as to be intervened by a non-conductive section or gaps such that the positions of three vertices among the four vertices of a minimum bounding rectangle identified by using a plurality of positions touched by the conductive section on the contact face are located at touched positions among the plurality of touched positions.

Furthermore, as an aspect of the present invention, preferably, the game piece includes an extended game piece having an extension piece including the conductive section attached thereto, and the conductive section is laid out on the contact face of the extended game piece so as to be intervened by a non-conductive section or gaps such that the positions of three vertices among the four vertices of a minimum bounding rectangle identified by using the plurality of positions touched by the extended game piece are located at touched positions among the plurality of touched positions.

A game piece set according to an aspect of the present invention is a game piece set constituted of a plurality of game pieces according to any one of claims 9 to 11, the game piece set being characterized in that the conductive section is laid out on the contact face so as to be intervened by a non-conductive section or gaps such that the layout position thereof differs in accordance with the kind of each of the game pieces.

Advantageous Effects of Invention

This invention makes it possible to use an existing electrostatic-capacitance-based touchscreen as a board for a board game.

DESCRIPTION OF EMBODIMENTS

A board game system according to an embodiment of the present invention will be described below with reference to the drawings. In the board game system, a user is provided with a board game by using a touchscreen as a board for the board game, for example, as a board for shogi or chess, and placing physical pieces on the board.

A technical feature of the embodiment of the present invention is that it becomes possible to use a number of pieces exceeding a maximum for multi-touch recognition by utilizing a phenomenon wherein a sufficient change in electrostatic capacitance on a touchscreen occurs for the first time when a piece formed from a material containing a certain amount of conductor, such as a metal that alone does not suffice to cause a response from the touchscreen, is held by a person with his/her bare hand and a current flows through the body of that person.

Another technical feature of the embodiment of the present invention is that, by identifying states such as a touch for placing a piece (putting touch), a touch for picking up a piece (detaching touch), and a touch for placing a piece at another position (moving touch), it becomes possible to use a number of pieces exceeding a recognition maximum for these kinds of multi-touch.

Another technical feature of the embodiment of the present invention is that the board game system according to the embodiment of the present invention makes it possible to use an existing touchscreen based on electrostatic capacitance as a board for a board game without having to prepare new hardware specialized for the game. A specific configuration will be described below.

Figure 1:
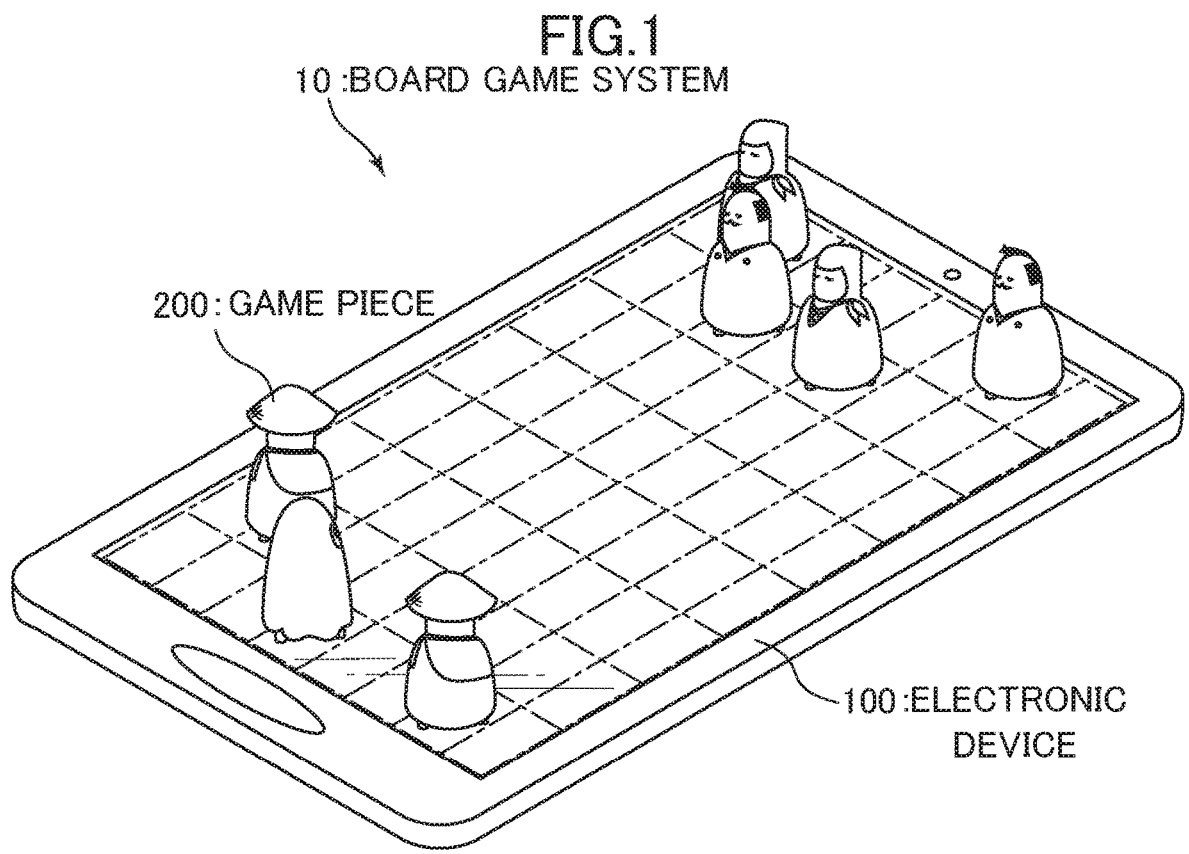
FIG. 1 is a schematic illustration of a board game system according to one embodiment of the present invention.

FIG. 1 is a schematic illustration of a board game system 10 according to an embodiment of the present invention. As shown in FIG. 1, the board game system 10 includes an electronic device 100 and one or more game pieces 200.

Figure 2:
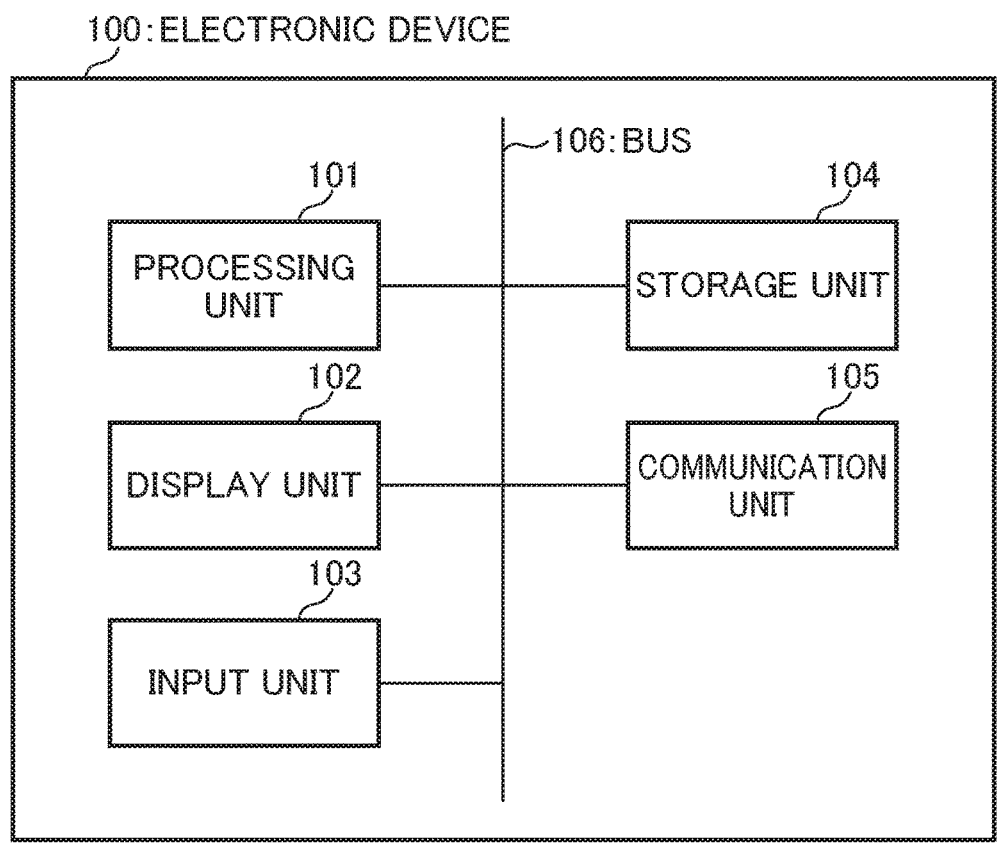
FIG. 2 shows the hardware configuration of an electronic device according to one embodiment of the present invention.

FIG. 2 is a block diagram showing the hardware configuration of the electronic device 100 according to the embodiment of the present invention. The electronic device 100 includes a processing unit 101, a display unit 102, an input unit 103, a storage unit 104, and a communication unit 105. These components are connected to each other via a bus 106. Alternatively, however, these components may be connected individually as needed.

The electronic device 100 is a tablet computer equipped with a touchscreen, but may be smartphone or the like.

The processing unit 101 includes a processor (e.g., a CPU) that controls the components of the electronic device 100, and executes various kinds of processing by using the storage unit 104 (e.g., a main memory) as a work area. The display unit 102 displays a screen to a user under the control of the processing unit 101, and is implemented, for example, by a liquid crystal display.

The storage unit 104 includes a hard disk, a main memory, and a buffer memory. The hard disk stores programs. Alternatively, however, any kind of non-volatile storage or non-volatile memory that can store information, which may be removable, may be used in place of the hard disk. As another example, in the case where the electronic device 100 is a smartphone, the storage unit 104 includes a ROM and a RAM. The storage unit 104 stores programs and various kinds of data that may be referred to during the execution of the programs.

The storage unit 104 can further store data (e.g., tables) and programs for a database. The database is realized by the operation of the processing unit 101, etc.

The communication unit 105 carries out wireless communications, such as mobile communications or wireless LAN communications, and wired communications using an Ethernet (registered trademark) cable, a USB cable, or the like. The communication unit 105 makes it possible to download a program from a server and to store the program in the storage unit 104.

The input unit 103 is implemented by a contact-type input part for entering an input based on a position touched by a user to the electronic device 100. In the embodiment of the present invention, the electronic device 100 includes a touchscreen 110 constituted of the display unit 102 and the input unit 103.

The touchscreen 110 is an electrostatic-capacitance-based touchscreen of the type that detects a position by detecting a change in the electrostatic capacitance that occurs between the tip of the finger and a conductive film in the touchscreen when touched by the user with a finger or the like. Furthermore, the touchscreen 110 is an electrostatic-capacitance-based touchscreen that is capable of simultaneously detecting a plurality of touched positions, i.e., detecting a multi-touch, and is preferably a projection-type electrostatic-capacitance-based touchscreen.

In this case, in the touchscreen 110, for example, X-direction electrodes including a plurality of ITO transparent electrodes for detecting coordinates along the X direction are provided on the top side of a transparent insulating film, and Y-direction electrodes including a plurality of ITO transparent electrodes for detecting coordinates along the Y direction are provided on the bottom side of the transparent insulating film. Either the X-direction electrodes or the Y-direction electrodes are configured as receiving electrodes, and the other are configured as driving electrodes.

Although the electrostatic capacitance between the electrodes is usually constant, when a human finger approaches or touches the touchscreen 110, the number of lines of electric force decreases, whereby the electrostatic capacitance changes. Alternatively, when a human finger approaches or touches the touchscreen 110, capacitive coupling occurs between the finger and the electrodes in the touchscreen, whereby the electrostatic capacitance between the electrodes changes. This is because the human body has electrically conductive properties and generally has an electrostatic capacitance on the order of a few hundred picofarads. Therefore, the touchscreen 110 detects a change in the electrostatic capacitance when touched with a user's finger or the like. Even in the case where the user does not directly touch or approach the touchscreen 110, if the user touches the touchscreen 110 via a substance such as a metal (a substance having a lower electrical resistance compared with insulating substances), a current flows between the metal or the like and the human body, and thus the touchscreen 110 detects a change in the electrostatic capacitance.

The detection of a coordinate position along the X direction and the Y direction, based on a change in the electrostatic capacitance, is conducted by sequentially performing scanning along the X direction and the Y direction while switching the roles of the receiving electrodes and the driving electrodes. In the embodiment of the present invention, the touchscreen 110 detects a touch as well as a position on the touchscreen in the case where a predetermined amount (the predetermined or greater amount) of change in the electrostatic capacitance has been detected.

Figure 3:
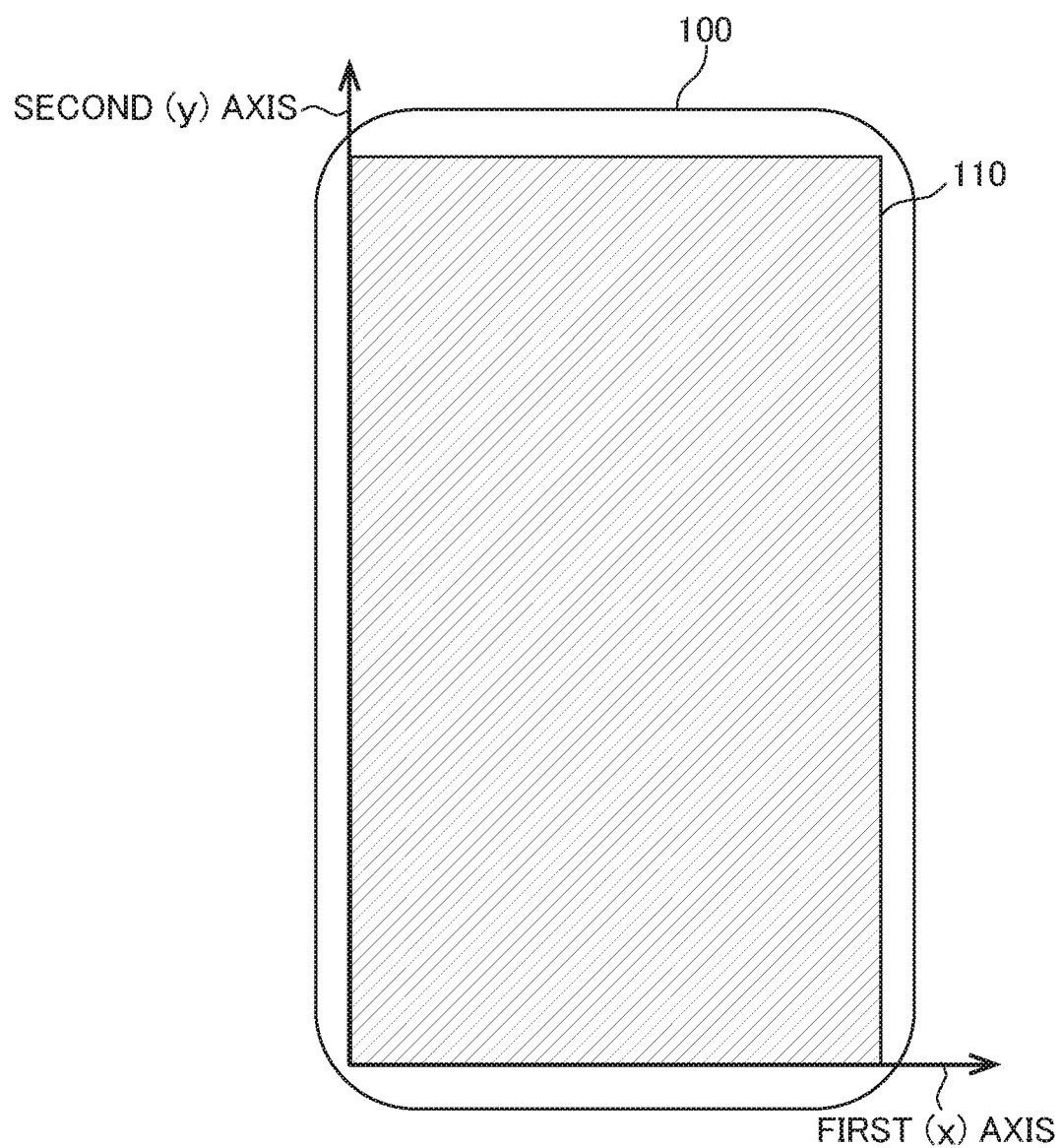
FIG. 3 is an illustration showing coordinate axes of a touchscreen of the electronic device according to one embodiment of the present invention.

In the touchscreen 110, a position is designated in the form of coordinates by using a coordinate plane defined by a first axis and a second axis that is substantially perpendicular to the first axis. Preferably, as shown in FIG. 3, the first axis is substantially parallel to the shorter sides of the touchscreen 110, which has a substantially rectangular shape, the second axis is substantially parallel to the longer sides of the touchscreen 110, and a position is represented in the form of coordinates (x, y) based on a coordinate axis along the direction of the first axis (horizontal axis) and a coordinate axis along the direction of the second axis (vertical axis).

In one example, by using a program or the like, the processing unit 101 obtains a touched position detected by the touchscreen 110 as data of the coordinates (x, y). For example, in the case where the precision of detection by the touchscreen 110 is 640 dots×1,136 dots, the touchscreen 110 has a resolution of 640 dots along the horizontal axis direction and 1,136 dots along the vertical axis direction. In this case, each dot may be a single point or a certain region (cell). Note, however, that the distance between dots usually varies among touchscreens (electronic devices).

In this specification, unless otherwise specifically mentioned, the "distance" refers to a distance based on the above coordinates. The coordinate setting shown in FIG. 3 is an example of such coordinates, and coordinate axes may be set by using a program. Alternatively, polar coordinates may be set, or other types of coordinates may be set by performing coordinate transformation.

Figure 4:
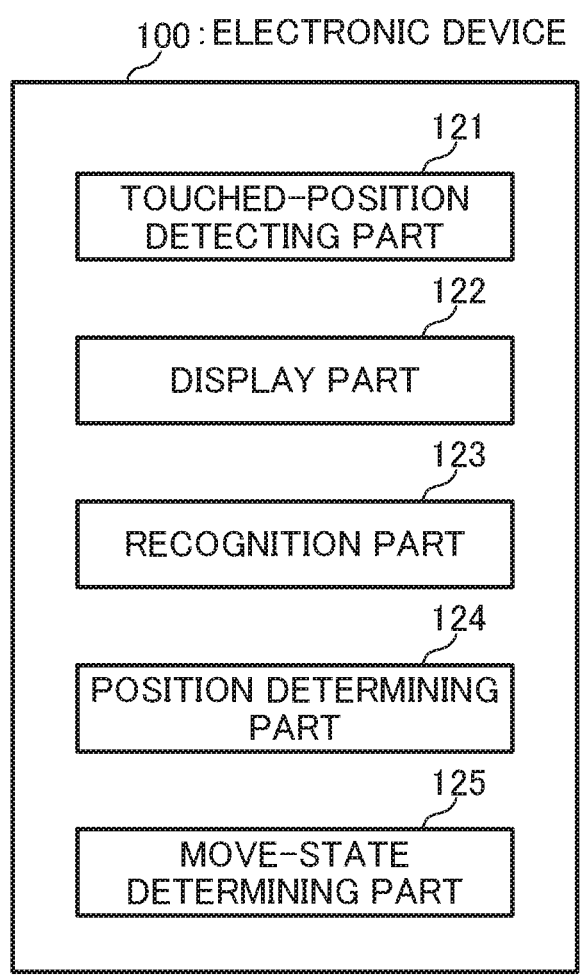
FIG. 4 is a functional block diagram of the electronic device according to one embodiment of the present invention.

FIG. 4 shows a functional block diagram of the electronic device 100 according to the embodiment of the present invention. The electronic device 100 includes a touched-position detecting part 121, a display part 122, a recognition part 123, a position determining part 124, and a move-state determining part 125. These functions are realized by executing programs. Therefore, the functionality of a part may be implemented in another part in part or in entirety.

The touched-position detecting part 121 has the functionality for providing the electronic device 100 with a detected touched position in the case where a predetermined or greater amount of change in the electrostatic capacitance has been detected when the touchscreen 110 is touched with a finger or the like. Therefore, the threshold for determining whether or not a touch has occurred is the predetermined or greater amount of change in the electrostatic capacitance. In the case where a touch is detected by the touched-position detecting part 121, for example, the touched coordinates are stored in a predetermined variable, or the touch event is stored in an event queue.

Furthermore, the touched-position detecting part 121 is capable of simultaneously detecting a plurality of touched positions. However, the multi-touch detection functionality of the touched-position detecting part 121 depends on the hardware characteristics of the touchscreen (electronic device). In the embodiment of the present invention, since the touchscreen 110 is an existing electrostatic-capacitance-based touchscreen, the maximum for multi-touch detection by the touchscreen 110 is about ten points, which is equivalent to the maximum for multi-touch detection by an ordinary touchscreen.

Furthermore, although it depends on the detection precision of the touchscreen, as described earlier, the touched-point resolution of the touchscreen 110 is fine, for example, in relation to the size of a finger (e.g., 10 to 15 mm). Thus, a single touched point, i.e., a single touched position, is generally determined from a plurality of touched points on the face on which a finger comes into contact with the touchscreen. Also in the embodiment of the present invention, the touched-position detecting part 121 can detect a single touched position from a single contact face by using a known method.

The display part 122 has the functionality for displaying an output from the electronic device 100 on the touchscreen 110 under the control of the processing unit 101. The display part 122 displays a game field for a board game, constituted of a plurality of areas, on the touchscreen 110. The display part 122 can also output an output from the electronic device 100 to a speaker (not shown) under the control of the processing unit 101.

Figure 5:
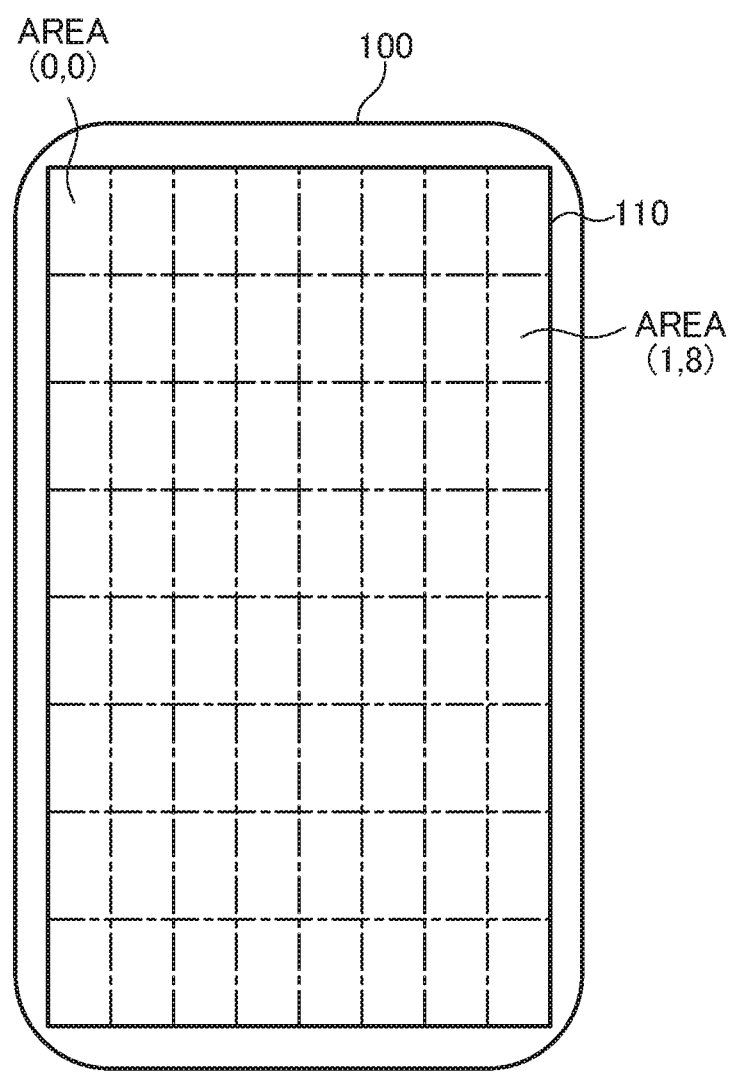
FIG. 5 is an illustration showing areas of a game field displayed on the touchscreen by a display part according to one embodiment of the present invention.

FIG. 5 shows an example of the areas of the game field that the display part 122 displays on the touchscreen 110. As shown in FIG. 5, the game field is divided into areas for placing the game pieces 200, and the positions of the individual areas can be identified by using area coordinates such as (1, 8). The area coordinates differ from the coordinates representing a touched position detected by the touchscreen 110.

The display part 122 may display the entire game field on the touchscreen 110 or may display a portion of the game field on the touchscreen 110. Each area associated with area coordinates corresponds to a certain region on the touchscreen 110, and is represented, for example, by the coordinate range of xy coordinates shown in FIG. 3. In one example, in the case where the display of the entire game field is changed, the regions of the individual areas are also changed. Note that the individual areas may be regions of arbitrary shapes instead of the grid structure shown in FIG. 5. Alternatively, the individual areas may be regions defined by using polygons.

In one example, the individual areas serving as the elements of a plurality of areas are the individual positions of a board for shogi or chess. In another example, the individual areas serving as the elements of a plurality of areas are the individual cells constituting sugoroku.

The recognition part 123, the position determining part 124, and the move-state determining part 125 will be described later.

Next, the game pieces 200 will be described. The game pieces 200 are pieces that are used in a board game provided by the board game system 10 and are used while being placed on the touchscreen 110. Each game piece 200 is constituted at least partially of a conductive section 210.

The conductive section 210 is a portion that is constituted of a substance that is electrically conductive, such as a metal. In the case where the entire game piece 200 is the conductive section 210, the entire game piece 200 is formed of a substance that is electrically conductive. Meanwhile, in the case where a portion of the game piece 200 is the conductive section 210, the game piece 200 includes a non-conductive section 220, which is a portion formed of a substance that is not electrically conductive, i.e., an insulating substance.

Figure 6:
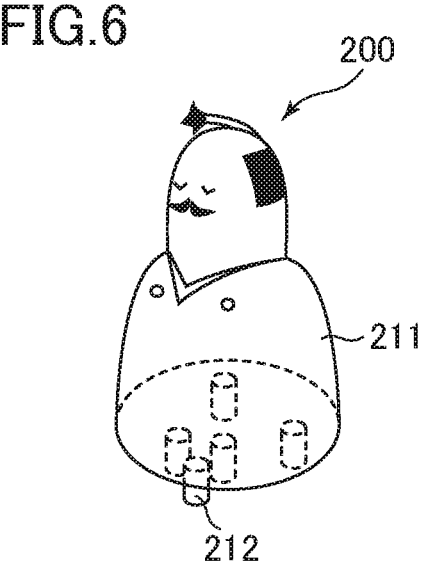
FIG. 6 is a schematic illustration of a game piece according to a first embodiment of the present invention.

A game piece 200 according to a first embodiment is a game piece 200 that is formed of a conductive section 210 in its entirety. FIG. 6 shows a schematic illustration of the game piece 200 according to the first embodiment. The game piece 200 includes a body 211 and a plurality of projections 212, and these two sections are formed in an integrated fashion.

Figure 7:
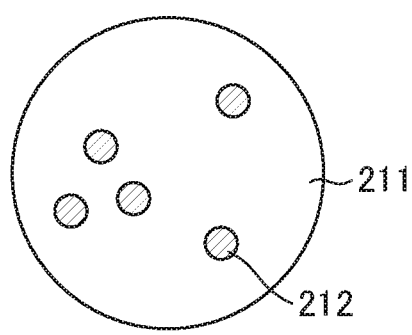
FIG. 7 is a plan view of the game piece in FIG. 6 as viewed from the direction in which a plurality of projections project.

When placed on the touchscreen 110, the game piece 200 is placed such that the end faces of the plurality of projections 212 come into contact with (the placing face of) the touchscreen 110. Therefore, preferably, the end faces of the plurality of projections 212 are substantially located in the same plane. The game piece 200 is configured such that the end faces of the plurality of projections 212, i.e., the conductive section 210, are disposed with intervening gaps at the faces that contact the touchscreen 110. FIG. 7 is a plan view (bottom view) of the game piece 200 according to the first embodiment as viewed from the direction in which the plurality of projections 212 project.

In the case where the game piece 200 is placed on the touchscreen 110, the conductive section 210 causes a change in the electrostatic capacitance of the touchscreen 110 on the face that contacts the end faces of the plurality of projections 212. However, the conductive section 210 does not cause a predetermined or greater amount of change in the electrostatic capacitance. That is, the conductive section 210 causes less than the predetermined amount of change in the electrostatic capacitance. Therefore, the contact of the end faces of the plurality of projections 212 of the game piece 200 placed on the touchscreen 110 is not detected by the touched-position detecting part 121.

Here, in the case where the user touches the conductive section 210 (the game piece 200), a current flows between the conductive section 210 and the human body, and thus the conductive section 210 touched by the user causes the predetermined or greater amount of change in the electrostatic capacitance on the face that contacts end faces of the plurality of projections 212. Therefore, in the case where the game piece 200 is touched by the user, the contact with the end faces of the plurality of projections 212 of the game piece 200 placed on the touchscreen 110 is detected by the touched-position detecting part 121.

Since the conductive section 210 in this embodiment, i.e., the game piece 200, has the characteristics described above, the game piece 200 must be implemented by a conductor having a relatively small mass. Preferably, the electrostatic capacitance of the game piece 200 is on the order of a few picofarads. In one example, the game piece 200 shown in FIG. 6 is constituted of a body 211 having a hollow structure. In another example, the game piece 200 is constituted of a few tens of grams of 316L stainless steel. It is to be understood, however, that since the threshold specifying the amount of change with which the touched-position detecting part 121 determines whether or not a touch has occurred (the predetermined amount of change in the electrostatic capacitance, described earlier) may be changed depending on the hardware characteristic and setting of the touchscreen (electronic device), the kind, mass, and shape of the conductor constituting the conductive section 210 are determined in accordance with the threshold.

Since the game piece 200 is configured as described above, in the case where the game piece 200 is placed on the touchscreen 110 and is touched by the user, the touched-position detecting part 121 detects, as a plurality of touched positions, the individual positions of contact with the end faces (the conductive section 210) of the plurality of projections 212 of the game piece 200.

The individual end faces of the plurality of projections 212, which constitute faces of contact with the touchscreen 110, have a size that allows detection by the touched-position detecting part 121. The size of the end faces of the plurality of projections 212 can be reduced as long as the end faces can be detected by the touched-position detecting part 121. For example, in the case where the size of the end faces corresponds to the size of a single dot of the touch-point resolution of the touchscreen 110, the end faces of the plurality of projections may be referred to as end points. Furthermore, the end faces of the plurality of projections 212 are disposed with intervening gaps such that the individual contact positions of the end faces can be detected as different touched positions by the touched-position detecting part 121.

Furthermore, the game pieces 200 are configured such that the layouts of the end faces of the plurality of projections 212 thereof differ in accordance with the individual game pieces 200 (the IDs of the game pieces 200). Alternatively, the game pieces 200 may be configured such that the layouts of the end faces of the plurality of projections 212 thereof differ in accordance with the kinds of the game pieces 200.

Figure 8:
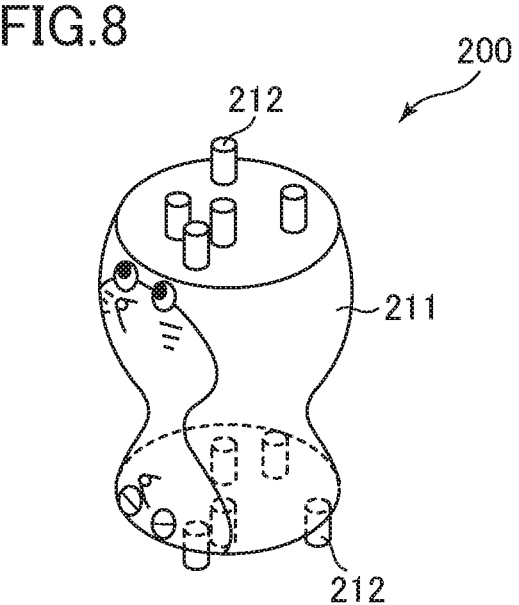
FIG. 8 is a schematic illustration of a game piece according to another example of the first embodiment of the present invention.

In one example, each game piece 200 has a plurality of projections 212 on a plurality of faces. As an example, FIG. 8 shows a game piece 200 having a plurality of projections 212 on both faces. The individual end faces of the plurality of projections 212 are substantially located in the same plane, and thus it is possible to place the game piece 200 on the touchscreen 110 such that the individual end faces come into contact with the touchscreen 110. In this case, the game piece 200 is configured such that the layouts of the plurality of projections 212 on the two faces differ from each other.

A game piece 200 according to a second embodiment is constituted of a conductive section 210 and a non-conductive section 220. The conductive section 210 in this embodiment is configured as a single mass as a portion of the game piece 200. Therefore, the periphery of the conductive section 210 is not entirely covered by the non-conductive section 220. In other words, a conductive section that is covered by a non-conductive section 220 on its entire periphery and thus cannot be electrically connected to the outside is not regarded as a conductive section 210.

Figure 9:
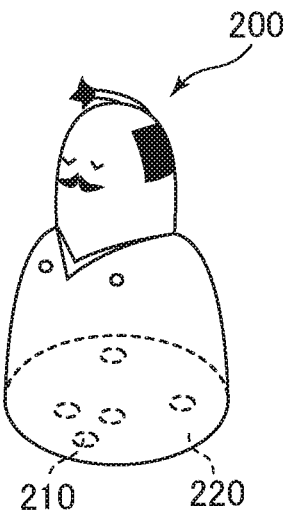
FIG. 9 is a schematic illustration of a game piece according to a second embodiment of the present invention.
Figure 10:
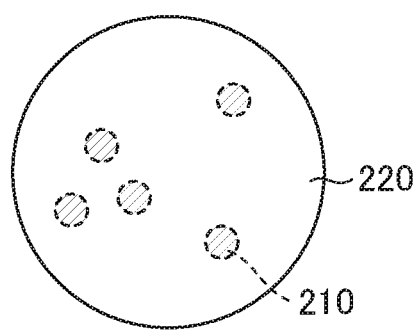
FIG. 10 is a bottom view of the game piece in FIG. 9.

FIG. 9 shows a schematic illustration of the game piece 200 according to the second embodiment. When the face that comes into contact with the placing face in the case where the game piece 200 is placed is considered as the bottom face, the bottom face is substantially planar. In the case where the game piece 200 is placed on the touchscreen 110, the bottom face comes into contact with (the placing face of) the touchscreen 110. FIG. 10 is a bottom face of the game piece 200 according to the second embodiment. As will be understood from FIG. 10, at the bottom face serving as the face that contacts the touchscreen 110, the conductive section 210 is disposed while being intervened by the non-conductive section 220.

In the case where the game piece 200 is placed on the touchscreen 110, the conductive section 210 causes changes in the electrostatic capacitance at the plurality of contact faces intervened by the non-conductive section 220. However, the conductive section 210 does not cause a predetermined or greater amount of change in the electrostatic capacitance. Therefore, the contact by the conductive section 210 of the game piece 200 placed on the touchscreen 110 is not detected by the touched-position detecting part 121.

Herein, in the case where the user touches the conductive section 210, a current flows between the conductive section 210 and the human body, and thus the conductive section 210 touched by the user causes the predetermined or greater amount of change in the electrostatic capacitance on the plurality of contact faces intervened by the non-conductive section 220. Therefore, in the case where the game piece 200 is touched by the user, the contact by the conductive section 210 of the game piece 200 placed on the touchscreen 110 is detected by the touched-position detecting part 121. In this case, the game piece 200 is configured of the conductive section 210 at least in a predetermined portion that can be touched by the user, and the conductive section 210 in the predetermined portion is configured such that a current can flow therefrom to the conductive section 210 intervened by the non-conductive section 220 on the bottom face. Preferably, the game piece 200 includes a grip section (not shown) for gripping by the user, and the grip section is constituted of the conductive section 210.

Since the conductive section 210 in this embodiment has the characteristics described above, the conductive section 210 must be implemented by a conductor having a relatively small mass. Preferably, the electrostatic capacitance of the game piece 200, including the conductive section 210, is on the order of a few picofarads. In one example, the conductive section 210 is constituted of a few tens of grams of 316L stainless steel. It is to be understood, however, that since the threshold specifying the amount of change with which the touched-position detecting part 121 determines whether or not a touch has occurred (the predetermined amount of change in the electrostatic capacitance, described earlier) may be changed depending on the hardware characteristic and setting of the touchscreen (electronic device), the kind, mass, and shape of the conductor constituting the conductive section 210 are determined in accordance with the threshold.

Since the game piece 200 is configured as described above, in the case where the game piece 200 is placed on the touchscreen 110 and is touched by the user, the touched-position detecting part 121 detects, as a plurality of touched positions, the individual contact positions of the conductive section 210 on the bottom face.

The conductive section 210 on the bottom face constituting the contact face has a size that allows detection by the touched-position detecting part 121. The conductive section 210 on the bottom face is intervened by the non-conductive section 220 such that the individual contact positions on the bottom face can be detected as different touched positions by the touched-position detecting part 121.

Furthermore, the game pieces 200 are configured such that the layouts of the conductive sections 210 on the bottom faces thereof differ in accordance with the individual game pieces 200. Alternatively, the game pieces 200 may be configured such that the layouts of the conductive sections 210 on the bottom faces thereof differ in accordance with the kinds of the game pieces 200.

In one example, each game piece 200 can be placed by using a plurality of faces. In this case, the plurality of faces can serve as bottom faces.

Figure 11:
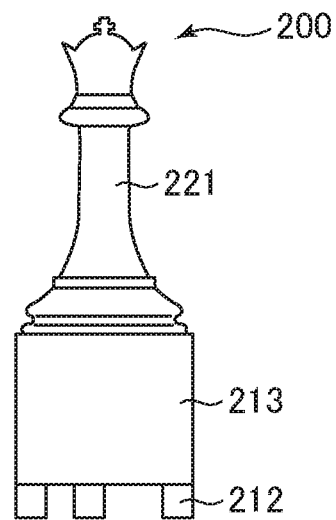
FIG. 11 is a schematic illustration showing a game piece according to a modification of the second embodiment of the present invention.

FIG. 11 shows a schematic illustration of a game piece 200 according to a modification of the second embodiment, which includes a non-conductive section 220. Note, however, that the game piece 200 according to this modification is a modification of the first embodiment in that it includes a plurality of projections 212.

The game piece 200 includes a plurality of projections 212, a grip 213, and a body 221. The plurality of projections 212 and the grip 213 are constituted of a conductive section 210, and the body 221 is constituted of a non-conductive section 220. Note, however, that a portion of the body 221 may be constituted of the conductive section 210.

When placed on the touchscreen 110, the game piece 200 is placed such that the end faces of the plurality of projections 212 come into contact with (the placing face of) the touchscreen 110. Therefore, preferably, the end faces of the plurality of projections 212 are substantially located in the same plane. The game piece 200 is configured such that the end faces of the plurality of projections 212, i.e., the conductive section 210, are disposed with intervening gaps at the faces of contact with the touchscreen 110. A plan view of the game piece 200 as viewed from the direction in which the plurality of projections 212 project is the same as that shown in FIG. 7.

Also in this modification, similarly, in the case where the game piece 200 is placed on the touchscreen 110, when the user does not touch the grip 213, the conductive section 210 does not cause a predetermined or greater amount of change in the electrostatic capacitance of the touchscreen 110 on the face that contacts the end faces of the plurality of projections 212 (the conductive section 210). Meanwhile, when the user touches the grip 213, the conductive section 210 causes the predetermined or greater amount of change in the electrostatic capacitance of the touchscreen 110 on the face that contacts the end faces of the plurality of projections 212.

A game piece 200 according to another modification of the second embodiment is a game piece 200 according to the first embodiment and further including a cylinder encompassing the plurality of projections 212 and constituted of a non-conductive section 220, wherein one of the side faces of the cylinder is substantially located in the same plane as the end faces of the plurality of projections 212, and the other side face of the cylinder is connected to the body 211. With this configuration, the end faces of the plurality of projections 212 constituted of the conductive section 210 and the side face of the cylinder constituted of the non-conductive section 220 constitute a face that contacts the touchscreen 110, which makes it possible to place the game piece 200 according to the first embodiment in a more stable state.

The game pieces 200 described above are examples of pieces used in a board game provided by the board game system 10. With a game piece 200 configured as described above, the touched-position detecting part 121 does not detect contact by the conductive section 210 of the game piece 200 placed on the touchscreen 110 when the user does not touch the game piece 200, while detecting contact when the user touches the game piece 200. Thus, the electronic device 100 does not recognize a game piece 200 that is not touched by the user and recognizes a game piece 200 that is touched by the user. This makes it possible to use a number of game pieces 200 exceeding a maximum for multi-touch detection. If the touched-position detecting part 121 detects a plurality of contact positions of game pieces 200 irrespective of user's contact, the maximum for multi-touch detection would be exceeded just by placing a plurality of game pieces 200 on the touchscreen 110, and thus it is not possible to realize the board game system 10.

Furthermore, with the game pieces 200 configured as described above, it becomes possible to use an existing electrostatic-capacitance-based touchscreen as a board for a board game without having to prepare new hardware specialized for the board game. Furthermore, as opposed to the conventional RFID method, which suffers the problem that individual identification is not possible in the case where game pieces are placed too closely, the embodiment of the present invention can utilize the resolution of an existing touchscreen, which makes it possible to play a board game even in the case where game pieces 200 are placed densely.

Here, the embodiment of the present invention employs a technology with which, in relation to a touchscreen 110 having an arbitrary resolution, a virtual space in the touchscreen 110 and physical game pieces 200 placed on the touchscreen 110 are coordinated seamlessly, regardless of the sizes of the game pieces 200 and the touchscreen 110.

As described earlier, the game pieces 200 are configured such that the conductive sections 210 thereof on the faces of contact with the touchscreen 110 are intervened by the non-conductive sections 220 or gaps in different layouts in accordance with the individual game pieces 200 (or the kinds thereof).

The recognition part 123 recognizes a game piece 200 on the touchscreen 110, touched by the user, on the basis of the relative positional relationships among a plurality of touched positions detected by the touched-position detecting part 121. Specifically, the recognition part 123 calculates relative coordinates from the coordinates (absolute coordinates) of the plurality of touched positions and recognizes the game piece 200 (or the kind thereof) on the basis of the position of the calculated relative coordinates. For example, the relative coordinates are calculated by using the following method.

The recognition part 123 extracts a minimum bounding rectangle (MBR) identified from all the points at the plurality of touched positions, and considers three touched positions corresponding to the positions of vertices of the extracted MBR as reference points. Thus, the plurality of positions touched by the game piece 200, i.e., the conductive section 210 on the face that contacts the touchscreen 110, are laid out so as to be intervened by the non-conductive section 220 or gaps such that the positions of three vertices among the four vertices of the identified MBR are included in the plurality of touched positions.

The recognition part 123 assigns numbers to the three touched positions (the positions of vertices) serving as the reference points by using the following method. First, of the vertices of the triangle constituted of the three touched positions, the point that is not located at one end of the shortest line segment is defined as the first reference point (P1). Next, of the vertices of the triangle constituted of the three touched positions, the point that is located at one end of the shortest line segment and at an intersection where two line segments cross each other substantially orthogonally is defined as the second reference point (P2). Then, of the vertices of the triangle constituted of the three touched positions, the point that is located at one end of the shortest line segment and at an intersection where two line segments cross each other at an acute angle is defined as the third reference point (P3).

Then, the recognition part 123 recognizes the plurality of positions touched by the single game piece 200, together with the numbers of the reference points, by assigning numbers in order of their distances from the first reference point. Furthermore, the recognition part 123 calculates relative coordinates of the plurality of touched positions and recognizes the plurality of touched positions by associating the touched positions with the numbers of the reference points and the relative coordinates.

In one example, the recognition part 123 defines relative coordinates of the reference points (P1 to P3) constituting the MBR as: (0, 0) for P2, (0, A) for P1, and (B, 0) for P3. Here, the values of A and B are values that are preset in order to define relative coordinates, and are set such that the ratio of the magnitudes of A and B becomes the same as the ratio of the distances of the line segment P1P2 and the line segment P2P3 based on the absolute coordinates. The recognition part 123 calculates relative coordinates of the remaining touched positions from the associations with the relative coordinates defined for P1 to P3. In this case, the relative coordinates of all the plurality of touched positions fall in a range of 0 to A for X coordinates and in a range of 0 to B for Y coordinates.

In another example, the relative coordinates of the reference points (P1 to P3) constituting the MBR are defined as (0, 0) for P2, (0, 100) for P1, and (100, 0) for P3, and the relative coordinates of the remaining touched positions are calculated from the associations with the relative coordinates defined for P1 to P3.

By using three touched positions as reference points, as described above, it becomes possible for the recognition part 123 to identify relative positional relationships of all the touched positions and to recognize the orientation of the game piece 200. Furthermore, with a game piece 200 having an arbitrary size and a touchscreen 100 having an arbitrary size and resolution, it becomes possible for the recognition part 123 to identify the relative positional relationships among the touched positions of the single game piece 200.

In one example, the electronic device 100 includes a game-piece database. The game-piece database is a database that associates the ID of each game piece 200 with a set of relative coordinates that can be associated with a plurality of touched points (touched positions). In this case, the recognition part 123 identifies the ID of the game piece 200 by searching the game-piece database for a set of relative coordinates derived on the basis of a plurality of touched positions detected by the touched-position detecting part 121. This makes it possible for the recognition part 123 to recognize the game piece 200 (or the kind thereof). In this case, in the case where no game-piece identifier corresponding to the set of relative coordinates derived from the plurality of touched positions detected by the touched-position detecting part 121 is stored, the recognition part 123 assumes an illegitimate input or an incorrect input and recognizes an error.

In one example, the recognition part 123 recognizes an error in the case where four touched positions among the plurality of touched positions detected by the touched-position detecting part 121 correspond to the positions of the four individual vertices of the extracted MBR.

In one example, when an error is recognized by the recognition part 123 as described above, the electronic device 100 stops the processing based on a multi-touch, which resulted in the recognized error. In one example, when an error is recognized by the recognition part 123 as described above, the display part 122 displays the occurrence of the error on the touchscreen 110.

Figures 12, 13:
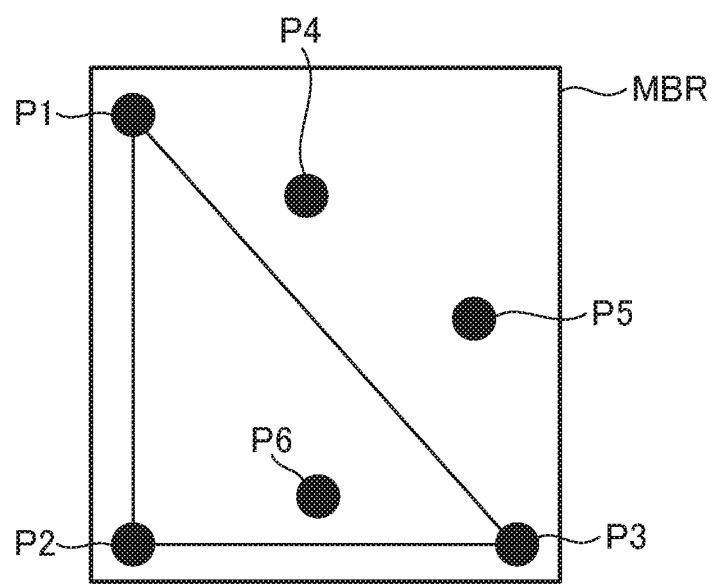
FIG. 12 is an illustration showing contact positions at which a plurality of projections of a game piece according to one embodiment of the present invention come into contact with the touchscreen.
FIG. 13 shows an example of the data structure of a move-state management database.

For example, in the case where the game piece 200 shown in FIG. 11 is provided with six projections 212 constituted of the conductive section 210, when the user touches the grip 213, the touched-position detecting part 121 detects six touched positions [(x1, y1), (x2, y2), (x3, y3), (x4, y4), (x5, y5), (x6, y6),] with the end faces of the six projections 212. FIG. 12 shows the contact positions at which the six projections 212 of the game piece 200 come into contact with the touchscreen 110. The contact positions are detected as six touched positions by the touched-position detecting part 121.

As shown in FIG. 12, the recognition part 123 extracts an MBR identified from the six touched positions and defines three touched positions corresponding to the positions of vertices of the extracted MBR as reference points. Then, the recognition part 123 assigns numbers to the three reference points by using the number assigning method described earlier to recognize the three reference points, for example, as P1, P2, and P3, and defines relative coordinates thereof. Then, the recognition part 123 assigns numbers (P4 to P6) in order of the distances from P1 and calculates relative coordinates to recognize the six touched positions P1 to P6 by the single game piece 200 together with the relative coordinates thereof. This makes it possible for the recognition part 123 to recognize the game piece 200.

The position determining part 124 determines the position of an area for the recognized game piece 200 in the game field displayed on the touchscreen 110 on the basis of the plurality of touched positions detected by the touched-position detecting part 121.

In one example, the position determining part 124 determines the position of the area for the game piece 200 by determining which area includes the center position of the MBR extracted by the recognition part 123.

In another example, the position determining part 124 determines the position of the area for the game piece 200 by determining which area includes the position of a specific one of the plurality of positions touched by the game piece 200.

In one example, the position determining part 124 does not determine the position of the game piece 200 in the case where the recognition part 123 recognized an error for the game piece 200.

In the embodiment of the present invention, since the electronic device 100 recognizes a game piece 200 when the game piece 200 is touched by the user, it is difficult to ascertain the game piece 200 actually placed on the touchscreen 110 by directly using the detected touched positions. In order to ascertain the move state of the game piece 200, the move-state determining part 125 determines the move state of the recognized game piece 200 on the basis of a history at the determined area position for the recognized game piece 200.

The move state includes a state in which the game piece 200 has been newly put at the position of an area on the touchscreen 110 (newly put state); a state in which the game piece 200 has been picked up from the touchscreen 110 (detached state); and a state in which the game piece has been moved and put at the position of another area on the touchscreen 110 (moved and put state). In another example, the move state includes a state in which the game piece 200 has been picked up from the position of an area of the touchscreen 110 and then put at the position of the same area (reput state). In another example, the move state is configured to include a put state and a detached state, and the put state includes a newly put state, a moved and put state, and a reput state.

In one example, the electronic device 100 includes a move-state management database. FIG. 13 shows an example of the data structure of the move-state management database.

The move-state management database is a database that associates area coordinates representing the position of an area, an on-the-move flag, and the ID of a game piece 200 (game-piece identifier). The on-the-move flag is a flag indicating whether or not the game piece 200 is being moved. "0" indicates that the game piece 200 is not being moved (off or false), and "1" indicates that the game piece 200 is being moved (on or true). In one example, the move-state management database is allowed to set the on-the-move flag to "1" only in one piece of row data (record).

When a single game piece 200 has been recognized and the area position for the game piece 200 has been determined, the move-state determining part 125 searches the move-state management database for the game-piece identifier of the game piece 200.

In the case where the game-piece identifier does not exist in the database, the move-state determining part 125 stores the game-piece identifier and the on-the-move flag "0" in association with the area coordinates determined for the recognized game piece 200, and determines that the move state is the put state (or newly put state).

In the case where the game-piece identifier exists in the database, the move-state determining part 125 determines whether the area coordinates determined for the recognized game piece 200 are the same as the area coordinates associated with the recognized game piece 200 in the database.

As a result of the determination, in the case where the area coordinates are the same and the on-the-move flag is "0", the move-state determining part 125 stores the game-piece identifier and the on-the-move flag "1" in association with the determined area coordinates, and determines that the move state is the detached state. As a result of the determination, in the case where the area coordinates are the same and the on-the-move flag is "1", the move-state determining part 125 stores the game-piece identifier and the on-the-move flag "0" in association with the determined area coordinates, and determines that the move state is the put state (or the reput state).

As a result of the determination, in the case where the area coordinates differ and the on-the-move flag is "0", the move-state determining part 125 determines that the state is an error, and stops the processing based on the multi-touch, which resulted in the determined error. Alternatively, however, the move-state determining part 125 may store the game-piece identifier and the on-the-move flag "0" in association with the determined area coordinates and may determine that the move state is the put state. As a result of the determination, in the case where the area coordinates differ and the on-the-move flag is "1", the move-state determining part 125 stores the game-piece identifier and the on-themove flag "0" in association with the determined area coordinates, and determines that the move state is the put state (or the moved and put state).

Referring to FIG. 13, it will be understood that game pieces 200 having game-piece identifiers F0001 and F0002 are in the put state at the area coordinates (0, 0) and (2, 0), respectively. Furthermore, it will be understood that a game piece 200 having a game-piece identifier F0023 that had been put is in the detached state at the area coordinates (3, 2).

Here, in the case where no game piece 200 is placed at given area coordinates, the move-state management database stores NULL (F9999) as a game-piece identifier associated with the area coordinates. Thus, it will be understood that, for example, no game piece 200 is placed at the area coordinates (1, 0). Alternatively, however, the move-state management database may be configured to include only data about area coordinates where game pieces 200 are placed, not including data about area coordinates where no game piece 200 is placed.

As described above, since the move-state determining part 125 identifies the move state, it becomes possible to ascertain game pieces 200 actually placed on the touchscreen 110 by using detected touched positions, which makes it possible to use a number of game pieces 200 exceeding the maximum for multi-touch detection.

In another example, when a single game piece 200 has been recognized, the move-state determining part 125 stores the recognized game piece 200 in association with the area position of the game piece 200, as a single piece of event data. The move-state determining part 125 can store, as history data, one or more pieces of event data about game pieces 200 that have been recognized so far (event history data).

In this case, the move-state determining part 125 determines, by using the event history data, whether or not the area position currently determined is the same as the area position determined immediately before for the recognized game piece 200. In the case where the area position currently determined is the same as the area position determined immediately before for the recognized game piece 200, the move-state determining part 125 determines that the move state is the detached state. In the case where the area position currently determined differs from the area position determined immediately before for the recognized game piece 200, the move-state determining part 125 determines that the move state is the moved and put state. In the case where there is no event data for the recognized game piece 200 other than the area position currently determined, the move-state determining part 125 determines that the move state is the newly put state.

Figure 14:
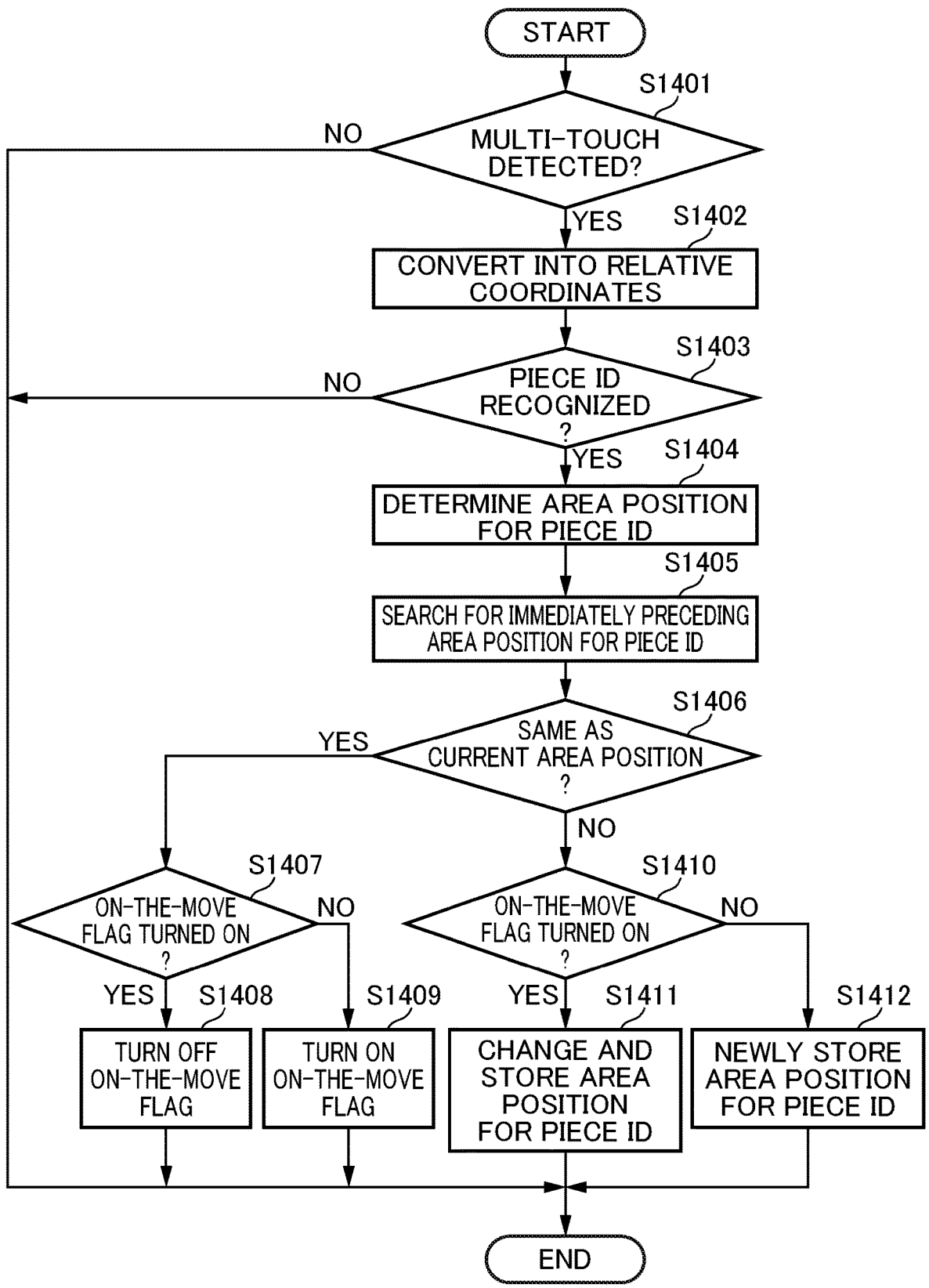
FIG. 14 is a flowchart showing information processing for state identification and management of a game piece according to one embodiment of the present invention.

FIG. 14 is a flowchart showing information processing for state identification and management of a game piece 200 according to the embodiment of the present invention. In this information processing, the game-piece database and the move-state management database, described earlier, are used.

First, in step 1401, it is determined whether or not a multi-touch has been detected. Here, at the time of start of this flowchart, for example, the electronic device 100 is in a state where a game program is being executed and a user is playing a game. For example, this flowchart is executed as a portion of a main loop of the game program or is invoked and executed in response to the occurrence of a touch event.

In this information processing, a tablet computer equipped with a touchscreen is used as the electronic device 100. Generally, the electronic device 100 performs touch detection at regular intervals and updates the screen at regular intervals. For example, the unit time for updating the screen may be set to be 1/30 seconds or 1/60 seconds.

In the case where a multi-touch is detected in step 1401, in step 1402, a plurality of detected touched positions are converted into relative coordinates. Then, in step 1403, the game-piece database is searched for a set of relative coordinates constituted of the plurality of converted touched positions. In the case where the game-piece identifier corresponding to the set of relative coordinates is not stored in the game-piece database, the processing according to this flowchart is terminated. For example, a waiting state for detecting a multi-touch event is continued as long as the game program is continuously executed. In the case where the processing according to this flowchart is terminated, an error message indicating an illegitimate input or an incorrect input may be sent to the user, or other kinds of error processing may be executed.

In one example, also in the case where it is not possible to convert the plurality of detected touched positions into relative coordinates in step 1402, the processing according to this flowchart is terminated in step 1403.

In one example, the data stored in the game-piece database varies depending on the kind of the game of the board game system 10, and the processing according to this flowchart is terminated in the case where a game piece 200 not supported in the game is placed. In one example, in the case where two game pieces 200 on the touchscreen 110 are touched simultaneously, since it is not possible to recognize the IDs of the game pieces 200, the processing according to this flowchart is terminated.

In the case where the game-piece identifier corresponding to the set of relative coordinates is stored in the game-piece database in step 1403, the game-piece identifier is recognized. When the game piece 200 has been recognized, in step 1404, an area position (area coordinates) for the game piece 200 in the game field is determined.

Then, in step 1405, the move-state management database is searched for the area coordinates that were determined immediately before for the recognized game piece 200. Then, in step 1406, it is determined whether or not the area coordinates currently determined in step 1404 are the same as the area coordinates determined immediately before.

In the case where it is determined in step 1406 that the area coordinates are the same, in step 1407, it is determined whether or not the on-the-move flag for the game-piece identifier of the recognized game piece 200 in the move-state management database is "1".

In the case where the on-the-move flag is "1", it is recognized that the user has returned the game piece 200 at the same area coordinates, and the on-the-move flag for the game-piece identifier is updated to "0" (step 1408). In the case where the on-the-move flag is "0", it is recognized that the user has detached the game piece 200 from the touchscreen 110, and the on-the-move flag for the game-piece identifier is updated to "1" (step 1409).

In the case where it is determined in step 1406 that the area coordinates differ or in the case where area coordinates that were determined immediately before did not exist, in step 1410, it is determined whether or not the on-the-move flag for the game-piece identifier of the recognized game piece 200 in the move-state management database is "1".

In the case where the on-the-move flag is "1", it is recognized that the user has moved the game piece 200. Then, the on-the-move flag "0" and the game-piece identifier are stored in association with the area coordinates currently determined, and data associated with the area coordinates determined immediately before is deleted. Upon deletion, "0" is stored in the on-the-move flag, and "NULL" is stored in the game-piece identifier (step 1411). In the case where the on-the-move flag is "0", it is recognized that the game-piece 200 has been newly put. Then, the on-the-move flag "0" and the game-piece identifier are stored in association with the area coordinates currently determined (step 1412).

Through the information processing described above, it is possible to identify and manage the move state of the game piece 200. This makes it possible to ascertain the game piece 200 actually placed on the touchscreen 110 by using the detected touched positions, which makes it possible to use a number of game pieces 200 exceeding the maximum for multi-touch detection. Note that, in this flowchart, as a basic rule, in the case where the electronic device 100 continuously performs multi-touch detection, for example, in the case where the user keeps on touching a game piece 200 on the touchscreen 110, the series of processing steps starting with the multi-touch detection in step 1401 is not resumed. However, for example, in the case where the area position determined for the relevant game piece 200 has been changed, the electronic device 100 terminates the processing according to this flowchart or executes some other kind of error processing, and returns to the waiting state for detecting a multi-touch event.

Furthermore, the information processing according to the flowchart is based on the assumption that when a single game piece 200 is picked up from the touchscreen 110, the game piece 200 will be placed on the touchscreen 110. However, the present embodiment is also applicable to other embodiments. For example, the electronic device 100 can update the move-state management database for game pieces 200 by way of information processing that is different from the processing according to this flowchart, which makes it possible to execute information processing in accordance with the properties of the game. Specifically, in the case where the game provided by the board game system 10 is shogi, in the case where a "pawn" of the user, which is one of the game pieces 200, is captured by the other user, it is possible to delete data of the on-the-move flag associated with the game-piece identifier for the "pawn".

In one example, in the case where it is recognized in step 1411 that the user has moved the game piece 200, the electronic device 100 displays an effect for the move on the touchscreen 110 and outputs a sound effect for the move from a speaker. For example, in the case where the game provided by the board game system 10 is shogi, in the case where the user picks up a "rook", which is one of the game pieces 200, and captures a "gold general" located at other area coordinates, which is also one of the game pieces 200, it is possible to output an animation or sound effect corresponding to the impact of this move.

In one example, in the case where the on-the-move flag is "0" in step 1407, the electronic device 100 recognizes that the game piece 200 has been detached from the touchscreen 110, and at the same time displays the directions in which the game piece 200 may be moved on the touchscreen 110. For example, in the case where the game provided by the board game system 10 is shogi, in the case where the user picks up a "gold general", which is one of the game pieces 200, the electronic device 100 can explicitly indicate the movable directions or movable area coordinates of the "gold general" on the touchscreen.

Next, extended game pieces 300 will be described. In one embodiment, game pieces 200 may include extended game pieces 300. In this embodiment, some or all of the game pieces 200 are extended game pieces 300 each constituted of a base piece 310, which can be used in itself as a game piece 200, and an extension piece 320, which is attached to the base piece to extend the functionality of the base piece 310. Although the base piece 310 in this embodiment will be described as a game piece 200 of the type shown in FIG. 11 and having a fitting section 314 described later, alternatively, the base piece 310 may be a game piece 200 of the type according one of the other embodiments described earlier and having a fitting section 314.

Figure 15:
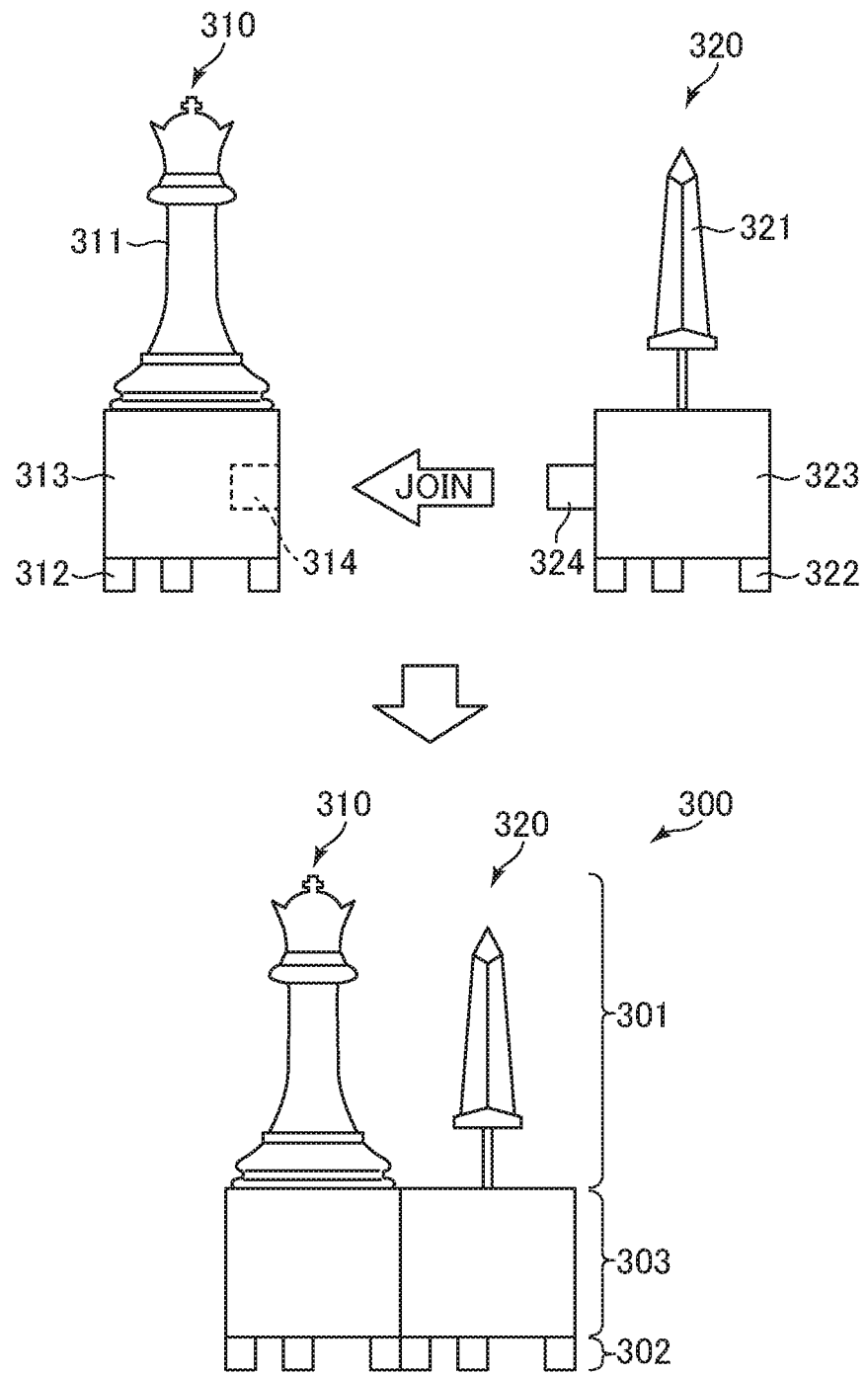
FIG. 15 is an illustration showing a base piece, an extension piece, and an extended game piece created by joining together the base piece and the extension piece according to one embodiment of the present invention.

FIG. 15 is an illustration showing a base piece 310, an extension piece 320, and an extended game piece 300 created by joining together the base piece 310 and the extension piece 320 according to an embodiment of the present invention. In one example, by joining a "sacred sword" serving as an extension piece 320 with a "queen" serving as a base piece 310, it is possible to create a "queen equipped with a sacred sword" as an extended game piece 300, as shown in FIG. 15.

The base piece 310 includes a body 311, a plurality of projections 312, and a grip 313, and similarly to the game piece 200 shown in FIG. 11, the plurality of projections 312 and the grip 313 are constituted of a conductive section 210. The extension piece 320 includes a body 321, a plurality of projections 322, and a grip 323, and at least the plurality of projections 322 and the grip 323 are constituted of a conductive section.

The base piece 310 includes a female fitting section 314 at the grip 313, and the extension piece 320 includes a male fitting section 324 at the grip 323. The single extended game piece 300 is realized by fitting the female fitting section 314 and the male fitting section 324 with each other. The extended game piece 300 created by joining together the base piece 310 and the extension piece 320 includes a plurality of projections 302 including the plurality of projections 312 and 322 and a grip 303 including the grips 313 and 323. Alternatively, however, the base piece 310 may include a male fitting section at the grip 313, and the extension piece 320 may have a female fitting section at the grip 323.

When placed on the touchscreen 110, the extension piece 320 is placed such that the end faces of the plurality of projections 322 come into contact with (the placing face of) the touchscreen 110. Therefore, preferably, the end faces of the plurality of projections 322 are substantially located in the same plane. Furthermore, the end faces of the plurality of projections 302, including the end faces of the plurality of projections 322, are substantially located in the same plane, and the end faces come into contact with the touchscreen 110 in the case where the extended game piece 300 is placed on the touchscreen 110. The end faces of the plurality of projections 302, i.e., the conductive section 210, are disposed with intervening gaps at the contact faces.

With the configuration described above, the conductive section 210 of the base piece 310 and a conductive section 350 of the extension piece 320 are also joined together such that a current can flow therethrough, and the conductive section 210 of the extended game piece 300 is configured as a single mass as a portion of the extended game piece 300. In the case where the extended game piece 300 is placed on the touchscreen 110, similarly to the base piece 310, when the user does not touch the grip 303, the conductive section 210 of the extended game piece 300 does not cause a predetermined or greater amount of change in the electrostatic capacitance of the touchscreen 110 on the face that contacts the end faces of the plurality of projections 302 (the conductive section 210). Meanwhile, when the user touches the grip 303, the conductive section 210 of the extended game piece 300 causes the predetermined or greater amount of change in the electrostatic capacitance of the touchscreen 110 on the face that contacts the end faces of the plurality of projections 302.

Next, a method of recognizing the extended game piece 300 will be described. Also in this embodiment, relative coordinates are calculated from the coordinates of a plurality of touched positions, and the extended game piece 300 is recognized on the basis of the position of the calculated relative coordinates. The calculation of the relative coordinates is the same as the embodiment described above.

Figure 16:
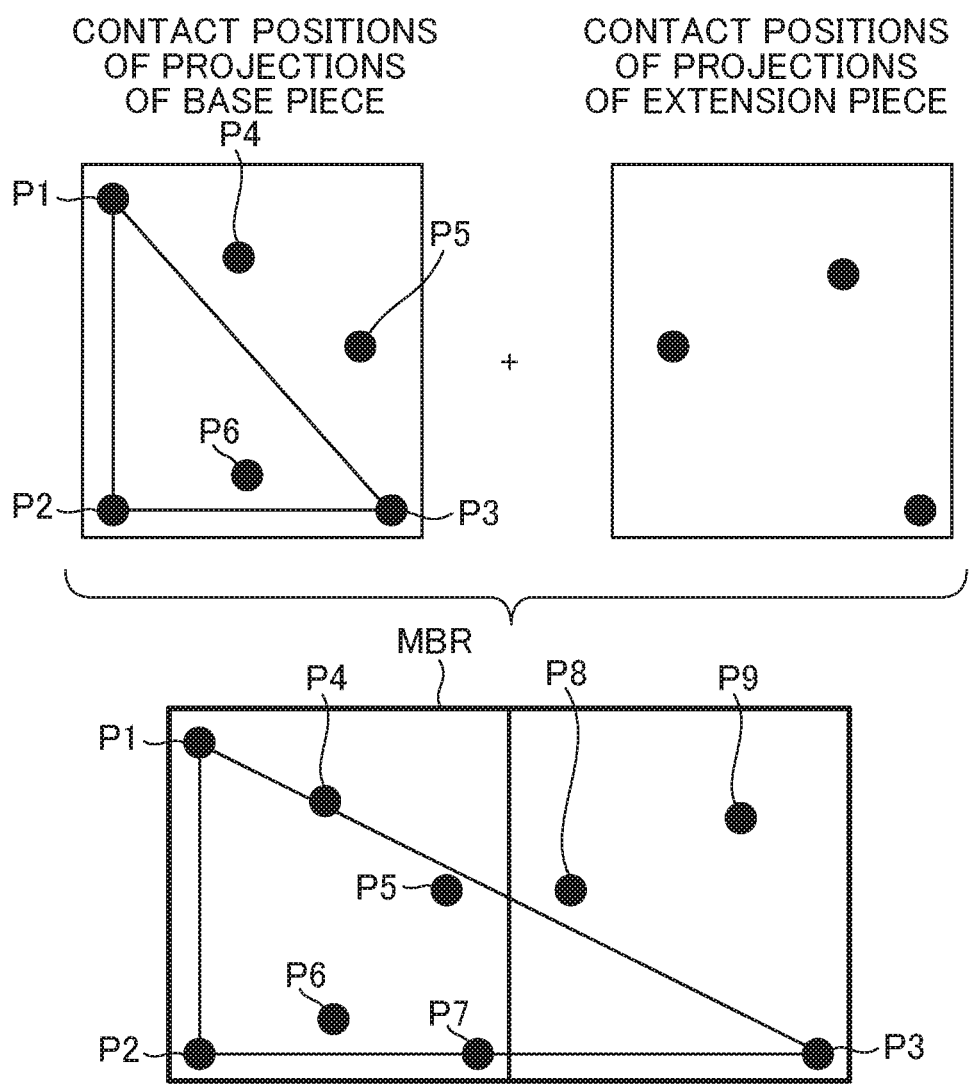
FIG. 16 is an illustration showing contact positions at which a plurality of projections of a base piece, a plurality of projections of an extension piece, and a plurality of projections of an extended game piece created by joining together these two pieces come into contact with the touchscreen according to one embodiment of the present invention.

Here, the description will be given in the context of the case where the base piece 310 includes six projections 312 and the extension piece 320 includes three projections 322. FIG. 16 is an illustration showing the positions of contact of the six projections 312 of the base piece 310 with the touchscreen 110, the positions of contact of the three projections 322 of the extension piece 320 with the touchscreen 110, and the positions of contact of the nine projections 302 of the extended game piece 300, created by joining these two pieces together, with the touchscreen 110.

When the conductive section 210 of the base piece 310 on the touchscreen 110 is touched by the user, similarly to the case described with reference to FIG. 12, the recognition part 123 recognizes six touched positons P1 to P6 of the base piece 310 together with relative coordinates thereof. In this case, let us suppose that the recognition part 123 defines the relative coordinates of the reference points (P1 to P3) constituting the MBR as (0, 0) for P2, (0, A) for P1, and (B, 0) for P3. The values of A and B are values that are preset in order to define relative coordinates, and are set such that the ratio of the magnitudes of A and B becomes the same as the ratio of the distances of the line segment P1P2 and the line segment P2P3 based on the absolute coordinates.

In the case where the extended game piece 300 created by joining the extension piece 320 with the base piece 310 is placed on the touchscreen 110 and the grip 303 thereof is touched by the user, similarly to the case of the base piece 310, the recognition part 123 recognizes nine touched positions P1 to P9 of the extended game piece 300 together with the relative coordinates thereof. Here, the shape of the MBR extracted by the recognition part 123 changes compared with the case of the base piece 310, as shown in FIG. 16. Thus, one (P3) of the three reference points constituting the MBR extracted by the recognition part 123 is changed, and for example, P3 is defined as (C, 0).

In one example, the recognition part 123 can recognize that a game piece 200 is an extend game piece 300 on the basis of the ratio of the magnitudes of A and C in the MBR extracted by the recognition part 123. In this case, preferably, the base piece 310 is configured such that, in the MBR extracted by the recognition part 123, the combinations of the values that can be taken by A and B do not include the combinations of values that can be taken by A and C, and are limited (preferably one combination). Similarly, preferably, the extended game piece 300 is configured such that, in the MBR extracted by the recognition part 123, the combinations of the values that can be taken by A and C do not include the combinations of values that can be taken by A and B, and are limited (preferably one combination).

By configuring the base piece 310 and the extension piece 320 as described above, it becomes possible for the recognition part 123 to identify the base piece 310 and the extended game piece 300. This makes it possible to create a new game piece 200 (an extended game piece 300) by joining an extension piece 320 with a game piece 200 (a base piece 310), which serves to improve the fun of a board game and to realize a more sophisticated game. For example, base pieces 310 or extension pieces 320 may be configured such that the layouts of the projections 312 or 322 (the conductive sections 210) thereof at contact positions not constituting the MBRs extracted by the recognition part 123 vary depending on the kinds of the pieces. This makes it possible to create an even greater variety of game pieces 200.

In another example, the recognition part 123 can recognize that a game piece 200 is an extended game piece 300 or a base piece 310 on the basis of the number of positions of contact of the conductive section 210 of the extended game piece 300 or the base piece 310 with the touchscreen 110.

Next, a method of manufacturing game pieces 200 will be described. In the embodiment of the present invention, since a large number of game pieces 200 (or kinds thereof) are required depending on the properties of the game, it is necessary to create game pieces 200 having conductive sections 210 of various layout patterns on the faces of contact with the touchscreen 110. Furthermore, as described earlier, the conductive section 210 must be implemented by a conductor having a relatively small mass in consideration of their characteristics described earlier. Preferably, the conductive section 210 has an electrostatic capacitance on the order of a few picofarads and is constituted of about a few ten grams of 316L stainless steel.

In one example, a game piece 200 that is constituted of a conductive section 210 in its entirety, as in the first embodiment, is created by using a 3D printer that utilizes a technology for sintering metallic powder (e.g., laser sintering). With this method, the interior of the body 211 shown in FIG. 6 can be made hollow, which makes it possible to reduce the mass while maintaining the size. Furthermore, the use of a 3D printer eliminates the need for creating molds for the individual layout patterns of the plurality of projections 212. Thus, it becomes possible to create game pieces 200 with relative ease and at relatively low costs. In another example, in the case of a game piece 200 in which a pedestal, such as the grip 213 shown in FIG. 11, is constituted of a conductive section 210, the pedestal is created by using a 3D printer. Also in this example, by making the interior of the pedestal hollow, it is possible to reduce the mass while maintaining the size.

The board game system 10 according to the embodiment of the present invention may further include a server (not shown). In this case, the electronic device 100 is connected to the server via a network. For example, the server may include the databases included in the electronic device 100 in the above-described embodiment on behalf of the electronic device 100, and the electronic device 100 can access the databases as needed.

Figure 17:
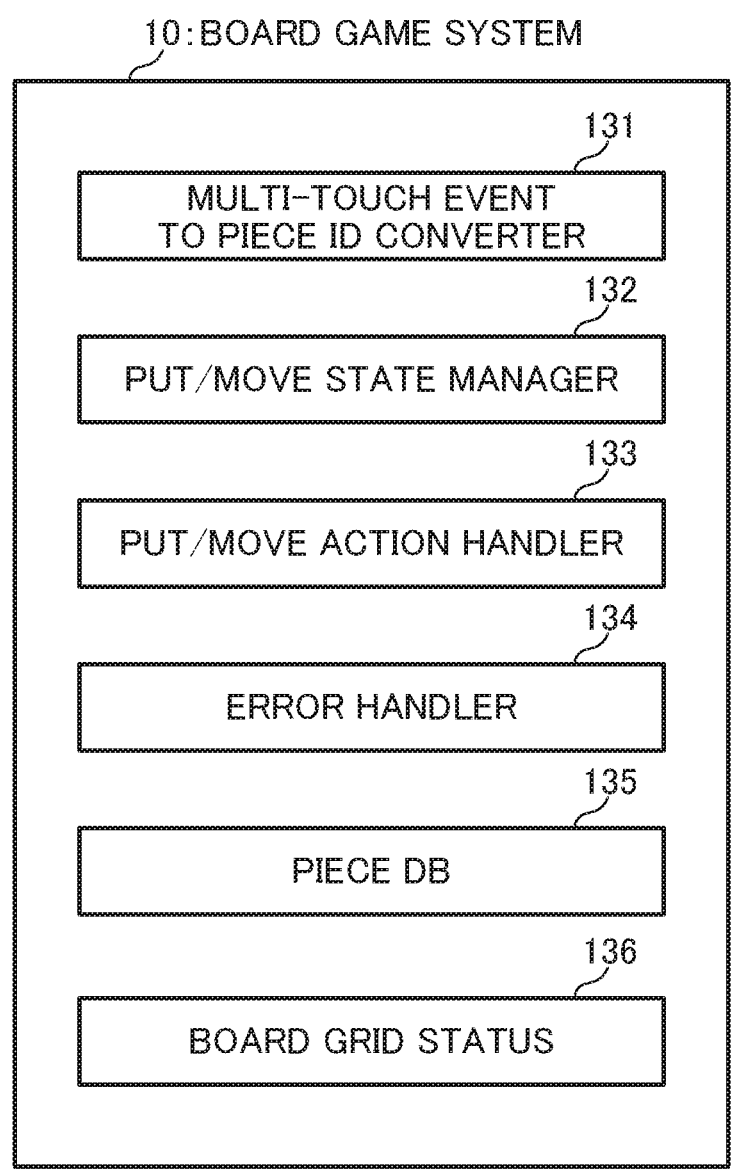
FIG. 17 is a diagram showing the system architecture of a board game system according to one embodiment of the present invention.

As described earlier, the board game system 10 has the functionalities shown in FIG. 4. Alternatively, however, the board game system 10 may be constituted of the six modules shown in FIG. 17. This modularization enables application to various kinds of games while modifying some of the modules.

A multi-touch event to piece ID converter 131 recognizes contact points as a multi-touch when a game piece 200 is placed on the touchscreen 110, and converts absolute coordinate information (e.g., [{100,120}, {300,400}, {124,176}, {432,655}, {876,20}]) representing the recognition result into relative coordinate information. The multi-touch event to piece ID converter 131 has the functionality corresponding to a portion of the recognition part 123.

A put/move state manager 132 is a module that identifies the states and actions of the game piece 200 from step 1404 to step 1412. Specifically, the put/move state manager 132 identifies whether a game piece 200 has been newly put or a game piece 200 on the board (the touchscreen 110) has been picked up to determine the board status. Alternatively, the put/move state manager 132 determines whether to assume an illegitimate state and execute error processing. The put/move state manager 132 has the functionality corresponding to a portion of the position determining part 124 and the move-state determining part 125.

A put/move action handler 133 is a module that updates the put/move state manager 132 representing the board status information and that executes actions in accordance with moves of game pieces 200. Examples of the actions include rendering of effects on the touchscreen 110. In one example, rendered effects include a video effect such as lighting up the point where a figure has been put or an audio effect in accordance with the character of a figure such as playing sound saying "Here comes Kerberos, the watchdog of Hell!" when a figure of "Kerberos, the watchdog of Hell" has been put. The put/move action handler 133 has the functionality corresponding to a portion of the display part 122 and the move-state determining part 125.

An error handler 134 is a module that is activated to issue an error notification to the user when an illegitimate state transition has been detected by the put/move state manager 132. Since game pieces 200 are physical objects, incorrect recognition and incorrect operation must be anticipated. The error handler 134 executes error processing when the put/move state manager 132 has detected a contradictory state, for example, an illegitimate state such as a state in which a new game piece 200 is put while another game piece 200 is being moved, a state in which another game piece 200 is also moved while a game piece 200 is being moved, or a game piece 200 is put twice at the same position. The error handler 134 has the functionality corresponding to a portion of the move-state determining part 125.

A piece DB 135 is a database that associates relative coordinate information (e.g., [{x1,y1}, {x2,y2}, {x3,y3}, {x4,y4}, {x5,y5}]) with the ID of a game piece. The piece DB 135 has the functionality corresponding to the game-piece database. A board grid status 136 is a module that manages which game pieces 200 are placed on the board grid. Specifically, in a conceivable implementation, as shown in FIG. 5, the screen is divided in the form of a grid for placing game pieces 200, and the individual cells are identified by using coordinate numbers. The board grid status 136 has the functionality corresponding to the move-state management database.

The examples described above are examples for explaining the present invention, and the present invention is not limited to the examples. For example, examples of game pieces 200 are not limited to what have been described above. The individual examples may be combined as appropriate and applied to any embodiment of the present invention as long as no inconsistency occurs. That is, the present invention can be embodied in various forms that are within the spirit thereof.

REFERENCE SIGNS LIST

10 Board game system
100 Electronic device
101 Processing unit
102 Display unit
103 Input unit
104 Storage unit
105 Communication unit
106 Bus
110 Touchscreen
121 Touched-position detecting part
122 Display part
123 Recognition part
124 Position determining part
125 Move-state determining part
200 Game piece
210 Conductive section
211, 221 Body
212 Projection
213 Grip
220 Non-conductive section
300 Extended game piece
310 Base piece
320 Extension piece
301, 311, 321 Body
302, 312, 322 Projection
303, 313, 323 Grip
314 Female fitting section
324 Male fitting section

The invention claimed is:

1. A board game system in which an electrostatic-capacitance-based touchscreen is used as a board, the board game system comprising:
an electronic device equipped with the touchscreen; and
a plurality of game pieces that are used while being placed on the touchscreen and that are constituted at least partially of a conductive section,
wherein a contact face of a game piece among the plurality of game pieces, which comes into contact with a placing face of the touchscreen, is configured to include the conductive section,
wherein the conductive section is laid out so as to be intervened by a non-conductive section or gaps on the contact face to form three vertices of four vertices of a minimum bounding rectangle,
wherein, in response to the game piece being placed on the touchscreen, the conductive section does not cause a predetermined or greater amount of change in an electrostatic capacitance at contact positions of the conductive section on the contact face in response to the conductive section being not touched by a user,
wherein the conductive section causes the predetermined or greater amount of change in the electrostatic capacitance at the contact positions of the conductive section on the contact face in response to the conductive section being touched by the user, and
wherein the electronic device: is configured to:
display a game field constituted of a plurality of areas on the touchscreen;
individually detect, as a plurality of touched positions, positions at which the predetermined or greater amount of change in the electrostatic capacitance has occurred as a result of contact of the conductive section on the contact face, the plurality of touched positions corresponding to the three vertices of the minimum bounding rectangle;
identifying relative positional relationships among the plurality of touched positions by using positions of the three vertices of the four vertices as reference;
recognize the game piece based on the relative positional relationships among the plurality of touched positions;

determine a position of a first area of the plurality of areas for the game piece recognized based on the plurality of touched positions;

determine a move state of the game piece based on a history of the position of the area of the game piece.

2. The board game system according to claim 1, wherein the game piece has a plurality of projections formed of the conductive section, and wherein end faces or end points of the plurality of projections constitute at least portions of the contact face.

3. The board game system according to claim 1, wherein determining the move state of the game piece is based on whether or not a position of an area currently determined or a position of an area determined immediately before for the game piece are the same.

4. The board game system according to claim 1, wherein the move state includes a state in which the game piece has been newly put at the position of a second area of the plurality of areas on the touchscreen, a state in which the game piece has been picked up from the touchscreen, and a state in which the game piece has been moved to and put at the position of a third area of the plurality of areas on the touchscreen.

5. The board game system according to claim 1, wherein the conductive section is laid out on the contact face so as to be intervened by the non-conductive section or the gaps such that a layout position thereof differs in accordance with a kind of the game piece, and wherein recognizing the kind of the game piece is based on the relative positional relationships among the plurality of touched positions.

6. The board game system according to claim 1,
wherein the plurality of game pieces include an extended game piece having an extension piece including the conductive section attached thereto.

7. A non-transitory computer readable medium storing a program that is executed by an electronic device equipped with an electrostatic-capacitance-based touchscreen that is capable of detecting a plurality of touches, the program being executed in order to use the touchscreen as a board for a board game, wherein, in a case where a game piece that is used while being placed on the touchscreen and that is constituted at least partially of a conductive section is placed on the touchscreen, no touched position of the game piece is detected by the touchscreen where the game piece is not touched by a user, and a plurality of positions touched by the game piece are detected by the touchscreen where the game piece is touched by the user, the program causing the electronic device to perform a method comprising:
displaying a game field constituted of a plurality of areas on the touchscreen;
individually detecting a plurality of touched positions by the game piece that is touched by the user, the plurality of touched positions corresponding to three vertices of four vertices of a minimum bounding rectangle that are formed by a conductive section being laid out so as to be intervened by a non-conductive section or gaps on the contact face;
identifying relative positional relationships among the plurality of touched positions by using positions of three vertices of the four vertices as reference;
recognizing the game piece based on the relative positional relationships among the plurality of touched positions;
determining the position of an area of the plurality of areas for the game piece based on the plurality of touched positions; and
determining a move state of the game piece based on a history of the position of the area of the game piece.

8. A game piece for a board game system in which an electrostatic-capacitance-based touchscreen that is capable of detecting a plurality of touched positions by detecting changes in electrostatic capacitance is used as a board, the game piece being used while being placed on the touchscreen,
wherein the game piece is constituted at least partially of a conductive section, and a contact face of the game piece, which comes into contact with a placing face of the touchscreen, is configured to include the conductive section, and
wherein the conductive section is laid out so as to be intervened by a non-conductive section or gaps on the contact face to form three vertices of four vertices of a minimum bounding rectangle,
wherein, in response to the game piece being placed on the touchscreen, the conductive section does not cause a predetermined or greater amount of change in an electrostatic capacitance at contact positions of the conductive section on the contact face in response to the conductive section being not touched by a user,
wherein the conductive section causes the predetermined or greater amount of change in the electrostatic capacitance at the contact positions of the conductive section on the contact face in response to the conductive section being touched by the user,
wherein relative positional relationships among the plurality of touched positions by using positions of three vertices of the four vertices as reference, and
where the game piece is recognized based on the relative positional relationships among the three vertices.

9. The game piece according to claim 8, wherein the game piece is an extended game piece having an extension piece including the conductive section attached thereto.

10. A game piece set constituted of a plurality of game pieces according to the game piece of claim 8, wherein the conductive section is laid out on the contact face so as to be intervened by the non-conductive section or the gaps such that the layout position thereof differs in accordance with a kind of each of the game pieces.

* * * * *